T. EMERY.
LOG-ROLLERS.
No. 184,233. Patented Nov. 14, 1876.
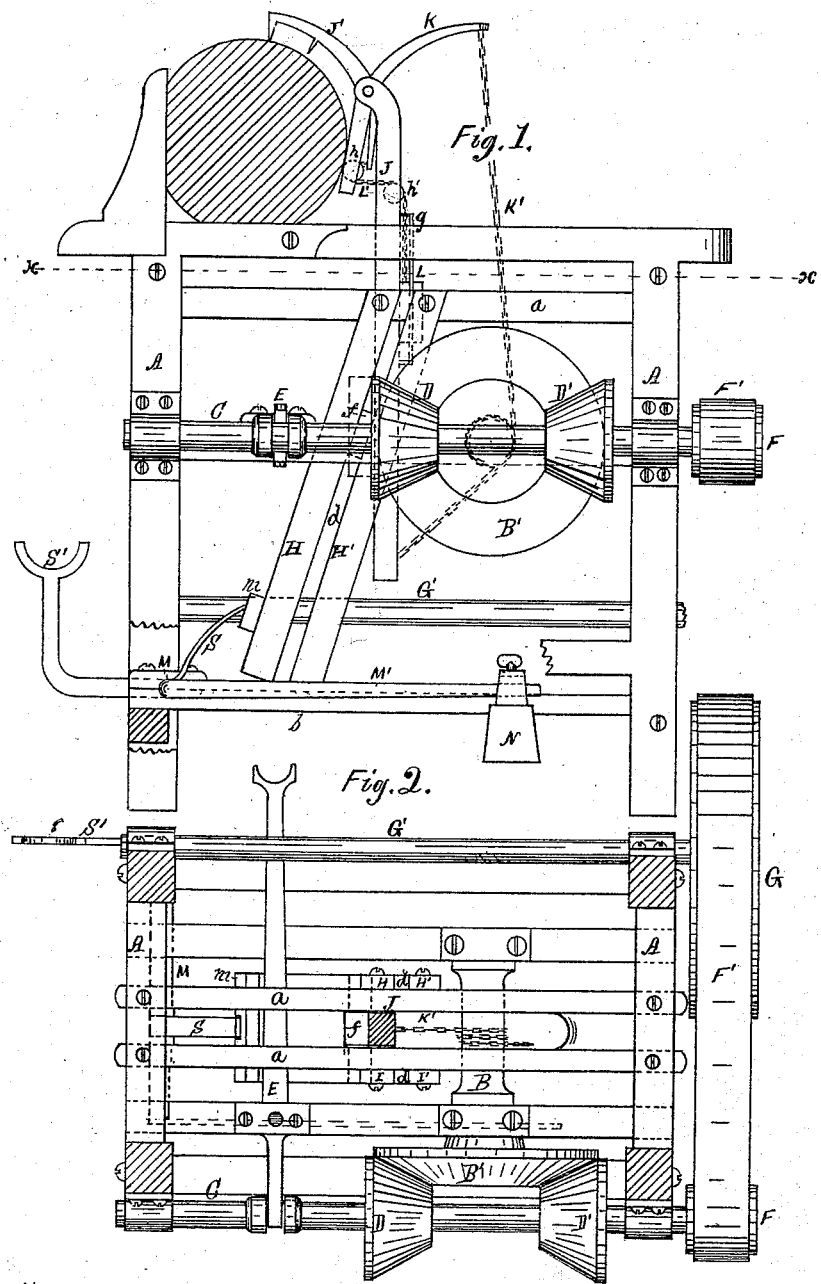

UNITED STATES PATENT OFFICE.

TEMPLE EMERY, OF PESHTIGO, WISCONSIN.

IMPROVEMENT IN LOG-ROLLERS.

Specification forming part of Letters Patent No. 184,233, dated November 14, 1876; application filed September 21, 1876.

*To all whom it may concern:*

Be it known that I, TEMPLE EMERY, of Peshtigo, in the county of Oconto and State of Wisconsin, have invented new and useful Improvements in Log-Rollers; and I do hereby declare the following to be a full, clear, and exact description thereof, which will enable others skilled in the art to which my invention appertains to make and use the same, reference being had to the accompanying drawing, forming part of this specification, in which—

Figure 1 represents a side elevation of a log-rolling apparatus embodying my invention; and Fig. 2 represents a sectional plan of the same, taken on the line $x\ x$ in Fig. 1.

Like letters of reference indicate like parts.

My invention relates to that class of log-rollers used in saw-mills for the purpose of turning the log after being placed upon the carriage; and the object of my invention is to so arrange the cant-hook, and the parts actuating it, as to admit of being operated, so as to turn the log by the motor used to drive the saw, and when not in use to admit of being dropped down, so as to be below the carriage. To that end my invention consists in the arrangement of the several parts, as is hereinafter described and claimed.

In the drawing, A represents a rectangular frame, which is located below the carriage, and so arranged as to support the operating parts constituting my said invention. B is a transverse shaft journaled in suitable bearings, which are attached to the center members of the frame A, and upon which shaft is mounted a beveled friction-wheel, B'. C is a horizontal shaft, which is journaled to the frame A, and is so arranged as to admit of a free and easy longitudinal movement. D D' are beveled friction-pinions, which are permanently mounted on the shaft C, and are so adjusted as to alternately engage with the face of wheel B' as the shaft C is moved forward or backward in the direction of its length. E is a shipping-lever, which is fulcrumed to the frame A, and connecting with the shaft C, as shown in Fig. 2, and is so arranged as to move the shaft C forward or backward, and so as to alternately engage the pinions D D' with wheel B' for reversing the movement of the shaft B by a reciprocal movement of the lever. F is a band-wheel or pulley, which is mounted on the end of shaft C, and around which is passed a band, F', extending to and around a band-wheel, G, on shaft G', by which a rotary motion is imparted to the shaft C by the rotation of shaft G'. H H' and I I' are inclined uprights, which are connected at their upper ends to the longitudinal members $a\ a$ of the frame, as shown in Fig. 2, and extend downward nearly to the bottom of the frame, as shown in Fig. 1, and the uprights H' and I' are permanently attached at their lower ends to the lower longitudinal members $b$ of the frame. The uprights H and I are so connected to the members $a\ a$ as to admit of a slight vibrating movement, and are so located relative to the uprights H' and I' as to form an inclined slot or space, $d$, between them. J is a vertical arm located between the members $a\ a$ of the frame, and is so arranged as to admit of a free and easy ascending or descending movement, and is fulcrumed at a point near its lower end to a cross-head, $f$, which is loosely secured at its ends within the slots $d$ of the uprights, and so adjusted as to freely move therein. J' is the cant-hook proper, which is made in the form shown in Fig. 1, and is journaled at a point below its center to the upper end of the arm J, and so arranged as to admit of a slight oscillating movement. K is an adjusting-lever, which is fulcrumed at a point near its center to the journal of the cant-hook, and is so adjusted as to admit of a free and easy tilting movement. K' is the chain for operating the cant-hook, and passes around the shaft B, and is attached at its upper end to the outer end of lever K, and at its lower end to the lower end of arm J, as shown in Fig. 1, and is so arranged as to elevate the arm J when the shaft B is made to rotate in one direction, and to cause said arm to descend when the movement of said shaft is reversed. L is a gravitating-weight, which is secured upon a guide or way, $g$, attached to the arm J, as shown by dotted lines in Fig. 1. L' is a chain or rope, which is permanently attached at one end to the shank of the cant-hook, and passing from thence over a sheave-wheel, $h$, journaled within the lower end of the lever K, and thence back over a like sheave-wheel, h', journaled within the arm J, and from thence downward, and is attached at its lower end to the weight L. The said chain and weight act to elevate the outer end of the lever K, so as to produce the required tension of the chain K' around the shaft B, for imparting an ascending or descending movement to the arm. M is a transverse rock-shaft, which is journaled to the frame near its base, as shown in Fig. 1, and permanently attached to one end thereof is a horizontal lever, M', extending nearly to the opposite end of the frame, and upon which is secured a weight, N, so arranged as to admit of being moved upon the lever in the direction of its length, and firmly secured at any adjusted point thereon. S is a spring-arm, which is attached to the shaft M, and adjusted to bear against a cross-bar, m, attached to the lower ends of the uprights H and I. S' is a shipping-lever, which is permanently attached to the end of the shaft M, for imparting a rocking movement to said shaft when necessary to relieve the pressure of the spring-arm from the cross-bar. The arrangement of the spring-arm and weighted lever is such as to hold the uprights H and I against the cross-head f of the arm J, so as to compress the cross-head between the said uprights and the uprights H' and I' sufficiently to hold the arm J at any desired point when not positively operated upon by the chain K', and to allow the arm J to fall when the spring-arm S is relieved from contact with the cross-bar by a backward movement of the shipping-lever S'.

My said log-roller is operated as follows: A rotary motion being imparted to the shaft C, the shipping-lever is moved so as to bring the pinion D in contact with the wheel B', thereby imparting a rotary motion to shaft B, which causes the chain K' to be wound around the said shaft, and thereby impart an upward movement to the arm J, bringing it to a vertical position, and carrying the cant-hook above the log. The shipping-lever is then changed so as to bring the pinion D' in contact with the wheel B', and thereby reversing the motion of the shaft B, and causing the arm to descend, so as to bring the cant-hook in contact with the log, and engages therewith; and by a further downward movement of the arm the log is caused to make one-fourth of a revolution, when the cant-hook is disengaged therefrom, and by means of the cross-head in the incline slot d the arm J is caused to assume an inclined position, so as to bring the cant-hook below the carriage. The shipping-lever is then changed, so as to disengage the pinion D' from contact with the wheel B', and the arm remains at rest until the log is to be again turned, when the shipping-lever is changed, so as to bring the pinion D in contact with the wheel B', when the arm again ascends.

Having thus described my invention, what I claim as new, and desire to secure by Letters Patent, is—

1. The combination, with the arm J, arranged to admit of an ascending and descending movement, of the cant-hook J', cross-head f, and the uprights H H' and I I', substantially as and for the purpose specified.

2. The combination, with the arm J, of the lever K, chain K', and shaft B, substantially as specified.

3. The combination, with arm J, cant-hook J', lever K, and chain K', of the rope L' and gravitating-weight L, substantially as and for the purpose specified.

4. The combination, with the arm J, provided with the cross-head f, of the uprights H H' and I I', arranged to form the incline slot or way d, substantially as and for the purpose specified.

5. The combination, with the uprights H and I, pivoted to admit of a vibratory movement, of the spring-arm S, rock-shaft M, weighted lever M', and shipping-lever S', substantially as and for the purpose specified.

TEMPLE EMERY.

Witnesses:
N. COWLES,
N. H. SHERBURNE.